US009985942B2

United States Patent
Williams et al.

(10) Patent No.: US 9,985,942 B2
(45) Date of Patent: May 29, 2018

(54) PORTABLE SIGN-IN SERVICE

(75) Inventors: Wayne E Williams, Liberty Lake, WA (US); Sam Davis, Spokane, WA (US); Mitchell Dean Williams, Liberty Lake, WA (US); Lucas Dean Hutyler, Spokane Valley, WA (US)

(73) Assignee: Weckey, Liberty Lake, WA (US)

( * ) Notice: Subject to any disclaimer, the term of this patent is extended or adjusted under 35 U.S.C. 154(b) by 593 days.

(21) Appl. No.: 13/561,677

(22) Filed: Jul. 30, 2012

(65) Prior Publication Data

US 2014/0032705 A1    Jan. 30, 2014

(51) Int. Cl.
| | |
|---|---|
| H04L 29/06 | (2006.01) |
| H04W 4/00 | (2018.01) |
| H04W 12/08 | (2009.01) |
| G06Q 10/00 | (2012.01) |
| G06Q 10/06 | (2012.01) |

(52) U.S. Cl.
CPC ............ *H04L 63/08* (2013.01); *G06Q 10/00* (2013.01); *G06Q 10/06* (2013.01); *H04W 4/001* (2013.01); *H04W 12/08* (2013.01)

(58) Field of Classification Search
CPC ......... G06F 21/123; H04W 4/02; H04L 63/08
USPC ........................ 709/217; 455/456.1; 340/5.52
See application file for complete search history.

(56) References Cited

U.S. PATENT DOCUMENTS

| | | | | |
|---|---|---|---|---|
| 4,806,743 | A | * | 2/1989 | Thenery .................... 235/462.45 |
| 5,566,327 | A | | 10/1996 | Sehr |
| 5,662,976 | A | * | 9/1997 | Popat ...................... B32B 38/00 283/101 |
| 5,939,694 | A | | 8/1999 | Holcomb et al. |
| 6,159,570 | A | * | 12/2000 | Ulrich ..................... B32B 38/00 283/109 |
| 6,192,416 | B1 | * | 2/2001 | Baxter .................... H04L 63/08 707/999.202 |
| 6,209,685 | B1 | | 4/2001 | Zaharia et al. |
| 6,354,494 | B1 | * | 3/2002 | Marcus ............. G07C 9/00079 235/380 |
| 6,609,658 | B1 | | 8/2003 | Sehr |
| 6,808,112 | B2 | | 10/2004 | Jacobi et al. |
| 6,867,683 | B2 | | 3/2005 | Calvesio et al. |
| 6,873,260 | B2 | | 3/2005 | Lancos et al. |

(Continued)

FOREIGN PATENT DOCUMENTS

| | | | |
|---|---|---|---|
| JP | 3297773 A | | 12/1991 |
| JP | 5079232 A | | 3/1993 |

(Continued)

OTHER PUBLICATIONS

Merriam Webster, "registered", 2015.*

(Continued)

*Primary Examiner* — Ondrej C. Vostal
(74) *Attorney, Agent, or Firm* — Lee & Hayes, PLLC

(57) ABSTRACT

Portable visitor stations that are easy to set up are disclosed. Portable visitor stations, including a visitor application stored on a portable computer may be set up for a facility by sending a location at which the portable computer is to be located at to a visitor processing service and sending a list of contacts associated with the facility to the visitor processing service. In some embodiments, the portable visitor station may be set up exclusively by sending only the received location and the received list to the visitor processing service.

14 Claims, 13 Drawing Sheets

(56) References Cited

U.S. PATENT DOCUMENTS

| | | | |
|---|---|---|---|
| 6,910,628 B1 | 6/2005 | Sehr | |
| 6,976,032 B1* | 12/2005 | Hull | G06Q 10/10 |
| 6,999,936 B2 | 2/2006 | Sehr | |
| 7,136,512 B2 | 11/2006 | Burns | |
| 7,172,113 B2 | 2/2007 | Olenick et al. | |
| 7,219,836 B2* | 5/2007 | Newburry | G07C 9/00079 |
| | | | 235/380 |
| 7,315,823 B2 | 1/2008 | Brondrup | |
| 7,337,963 B2 | 3/2008 | Harper et al. | |
| 7,353,184 B2* | 4/2008 | Kirshenbaum | G06Q 30/0204 |
| | | | 705/7.33 |
| 7,415,424 B1* | 8/2008 | Donner | G06Q 10/02 |
| | | | 235/382 |
| 7,496,191 B1* | 2/2009 | Crews et al. | 379/220.01 |
| 7,596,613 B2 | 9/2009 | Silverthorne et al. | |
| 7,600,679 B2 | 10/2009 | Kshirsagar et al. | |
| 7,802,724 B1 | 9/2010 | Nohr | |
| 7,813,934 B1* | 10/2010 | Chung | G06K 17/00 |
| | | | 340/572.1 |
| 7,823,773 B2 | 11/2010 | Hatzav et al. | |
| 8,032,409 B1* | 10/2011 | Mikurak | G06Q 10/00 |
| | | | 705/14.39 |
| 8,040,216 B2 | 10/2011 | Jordan et al. | |
| 8,085,126 B2 | 12/2011 | Determan et al. | |
| 8,112,808 B2* | 2/2012 | Harada | 726/26 |
| 8,200,755 B2* | 6/2012 | Fujimoto et al. | 709/204 |
| 8,577,965 B2* | 11/2013 | Hymel | H04L 12/6418 |
| | | | 705/319 |
| 8,756,501 B1* | 6/2014 | Karam | 715/700 |
| 2001/0018660 A1* | 8/2001 | Sehr | 705/5 |
| 2001/0052083 A1* | 12/2001 | Willins | H04L 9/32 |
| | | | 726/10 |
| 2002/0123843 A1* | 9/2002 | Hood | G01C 21/20 |
| | | | 701/433 |
| 2002/0161856 A1* | 10/2002 | Pineau et al. | 709/219 |
| 2003/0013438 A1* | 1/2003 | Darby | G06Q 30/02 |
| | | | 455/419 |
| 2004/0099731 A1* | 5/2004 | Olenick | G07F 17/26 |
| | | | 235/380 |
| 2004/0116115 A1 | 6/2004 | Ertel | |
| 2004/0203638 A1* | 10/2004 | Chan | H04W 4/02 |
| | | | 455/414.1 |
| 2005/0114192 A1 | 5/2005 | Tor et al. | |
| 2005/0167484 A1* | 8/2005 | Sussman | G06Q 20/341 |
| | | | 235/380 |
| 2005/0219360 A1 | 10/2005 | Cusack et al. | |
| 2005/0228860 A1* | 10/2005 | Hamynen | G06F 17/30241 |
| | | | 709/203 |
| 2005/0252976 A1* | 11/2005 | Dietze | 235/488 |
| 2006/0087410 A1 | 4/2006 | Garcia et al. | |
| 2006/0156392 A1* | 7/2006 | Baugher | 726/5 |
| 2006/0156416 A1* | 7/2006 | Huotari et al. | 726/27 |
| 2007/0130617 A1* | 6/2007 | Durfee | G06F 21/33 |
| | | | 726/5 |
| 2007/0136154 A1* | 6/2007 | Chung | G06Q 10/08 |
| | | | 705/29 |
| 2007/0164846 A1* | 7/2007 | Pedolsky | G06F 21/34 |
| | | | 340/5.2 |
| 2007/0168458 A1* | 7/2007 | Costa-Requena et al. | 709/217 |
| 2008/0288404 A1* | 11/2008 | Pirzadeh et al. | 705/44 |
| 2009/0064346 A1* | 3/2009 | Larsson et al. | 726/29 |
| 2009/0152347 A1 | 6/2009 | Peyrot | |
| 2009/0153325 A1 | 6/2009 | Birtcher et al. | |
| 2009/0266882 A1* | 10/2009 | Sajkowsky | G06K 17/00 |
| | | | 235/380 |
| 2010/0222026 A1* | 9/2010 | Dragt | G06Q 30/02 |
| | | | 455/412.1 |
| 2010/0285820 A1* | 11/2010 | Jozwiak | G06Q 30/02 |
| | | | 455/466 |
| 2010/0318407 A1* | 12/2010 | Leff | G06Q 10/107 |
| | | | 705/14.1 |
| 2011/0093703 A1* | 4/2011 | Etchegoyen | 713/168 |
| 2011/0105090 A1* | 5/2011 | Shackleton | G06Q 20/3224 |
| | | | 455/414.1 |
| 2011/0244798 A1* | 10/2011 | Daigle | H04L 63/08 |
| | | | 455/41.2 |
| 2011/0248818 A1* | 10/2011 | Hashim-Waris | 340/5.52 |
| 2011/0275388 A1* | 11/2011 | Haney | 455/456.3 |
| 2012/0095812 A1* | 4/2012 | Stefik | G06Q 10/02 |
| | | | 705/13 |
| 2012/0127308 A1* | 5/2012 | Eldershaw | G08B 13/1672 |
| | | | 348/143 |
| 2012/0190386 A1* | 7/2012 | Anderson | G01C 15/04 |
| | | | 455/456.3 |
| 2012/0197957 A1* | 8/2012 | de Voogd | 709/201 |
| 2012/0208512 A1* | 8/2012 | Maharajh et al. | 455/414.1 |
| 2012/0240060 A1* | 9/2012 | Pennington | G06F 1/1618 |
| | | | 715/753 |
| 2012/0280790 A1* | 11/2012 | Gerhardt | G07C 9/00309 |
| | | | 340/5.61 |
| 2013/0024949 A1* | 1/2013 | Baldwin et al. | 726/28 |
| 2013/0040654 A1* | 2/2013 | Parish | H04L 63/0807 |
| | | | 455/456.1 |
| 2013/0210418 A1* | 8/2013 | Cannon et al. | 455/420 |
| 2013/0222827 A1* | 8/2013 | Watanabe | G06F 3/122 |
| | | | 358/1.13 |
| 2013/0346268 A1 | 12/2013 | Pereira et al. | |

FOREIGN PATENT DOCUMENTS

| | | |
|---|---|---|
| JP | 5236140 A | 9/1993 |
| JP | 7046555 A | 2/1995 |
| JP | 7234694 A | 9/1995 |
| JP | 8138174 A | 5/1996 |
| JP | 2002209270 A | 7/2002 |
| JP | 2003114938 A | 4/2003 |
| JP | 2003208493 A | 7/2003 |
| JP | 2003216961 A | 7/2003 |
| JP | 2003288432 A | 10/2003 |
| JP | 20040075361 A | 3/2004 |
| JP | 2004246881 A | 9/2004 |
| JP | 2004348696 A | 12/2004 |
| JP | 2005024790 A | 1/2005 |
| JP | 2005050103 A | 2/2005 |
| JP | 2005135059 A | 5/2005 |
| JP | 2007128230 A | 5/2007 |
| JP | 2008140024 A | 6/2008 |
| JP | 2009003763 A | 1/2009 |

OTHER PUBLICATIONS

Merriam Webster, "organization", 2015.*
Merriam Webster, "forum", 2015.*
Merriam-Webster, "connect", 2015.*

* cited by examiner

PORTABLE SIGN-IN SERVICE

BACKGROUND

Self-service kiosks exist that allow a visitor to sign-in and sign-out without help from an attendant.

However, setting up, or installing, these kiosks is often challenging due to different hardware and/or software components used to operate the kiosk systems. For example, a system administrator may have to determine compatibilities of applications, hardware, software, and the like, to set up and operate these kiosks. Requiring a system administrator to set up and operate these kiosks detracts from the kiosk's ease of use.

Further, self-service kiosks exist that have specialized hardware and software integrated in a standalone unit. For example, specialized hardware and software may be integrated into a single standalone enclosure. However, these kiosks are often bulky due to the standalone enclosure housing the specialized hardware and software, thereby detracting from the kiosk's portability.

BRIEF SUMMARY

This Brief Summary is provided to introduce simplified concepts relating to techniques for setting up a portable visitor station, which are further described below in the Detailed Description. This Summary is not intended to identify essential features of the claimed subject matter, nor is it intended for use in determining the scope of the claimed subject matter.

This disclosure relates to portable visitor sign-in stations, including portable computing devices and visitor applications, and techniques for setting up such systems. In some embodiments, such systems may be configured to be set up by laymen (i.e., persons not skilled in system administration).

In some examples the portable visitor stations may be set up at an organization to track the coming and going of visitors to the organization. For example, the portable visitor station may be set up at a commercial facility (e.g., a place of an enterprise, a place of a business, a place of a company, etc.). In this example, the portable visitor station may be set up at the commercial facility simply by importing a list of contacts associated with the commercial facility, and designating a location at which a portable computing device having a visitor application stored thereon is to be located at the commercial facility.

In another example, the portable visitor stations may be set up at a commercial exhibition (e.g., trade fairs, trade shows, expos, etc.) to track the coming and going of attendees to one or more booths or stations of the commercial exhibition. In this example, the portable visitor station may be set up at the commercial facility simply by importing a list of contacts or attendees associated with the commercial exhibition, and designating a location at which a portable computing device having a visitor application stored thereon is to be located at the commercial exhibition.

In another example, the portable visitor stations may include one or more pieces of hardware connected to a portable computing device. For example, the portable visitor stations may include a printer and/or a camera connected to the portable computing device.

In examples where one or more pieces of hardware are connected to the portable computing device, a server may send instructions to the portable computing device to configure the piece(s) of hardware connected to the portable computing device. For example, the server may send instructions to the portable computing device to configure a printer and/or a camera connected to the portable computing device. Alternatively, the portable computing device may include a sign-in application that, when executed for the first time, configures the portable computing device, including recognizing any internal and/or peripheral hardware.

Once the portable visitor stations have been set up, the portable visitor stations may sign-in a visitor, print a visitor badge, and sign-out a visitor. For example, after being set up, a portable visitor station may sign a visitor into a commercial facility associated with an organization, and print a visitor badge for the visitor. The portable visitor station may provide the visitor's sign-in information to a server, and the server may send notifications to personnel associated with the organization. For example, the server may send a notification to an employee of the organization that he or she has a visitor. In another example, the portable visitor station may perform the notification itself, without the need for a separate server. The portable visitor station may sign-out the visitor via a barcode printed on the visitor badge.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
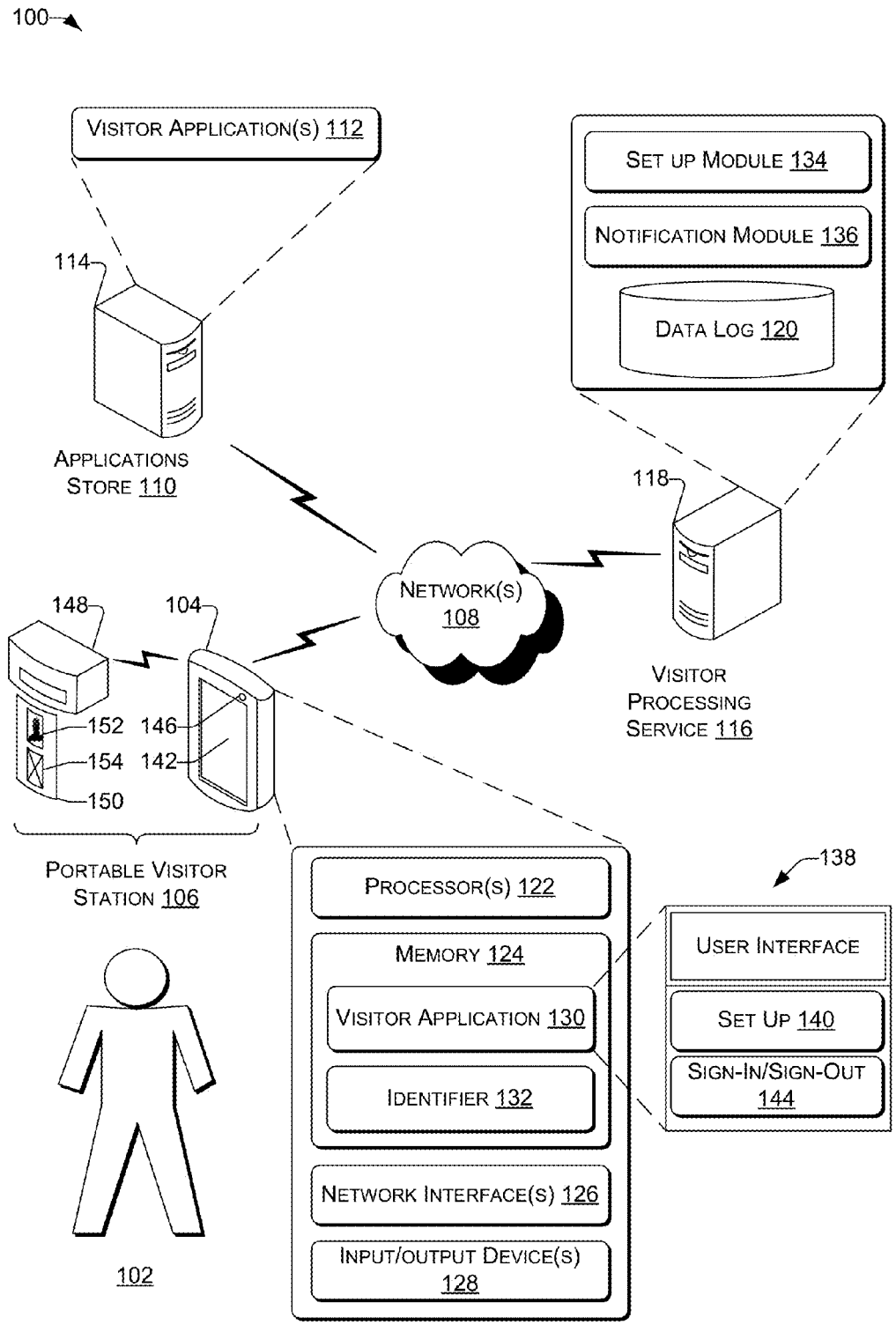
FIG. 1 illustrates an example architecture for implementing portable visitor stations. This example architecture illustrates a user operating a portable computing device having a visitor application stored thereon. The user may utilize the visitor application stored on the portable computing device to quickly and easily set up a portable visitor station.

As noted above, self-service kiosks are often relatively difficult to install due to integrating or setting up the different hardware and/or software components used to operate the self-service kiosks. Further, self-service kiosks are often relatively bulky due to specialized enclosures. This application describes portable visitor stations that are easy to set up and are portable. This application also describes various techniques for setting up such portable visitor stations. By way of example and not limitation, the portable visitor stations herein may be used by commercial organizations, private organizations, non-profit organizations, or any other organization that may utilize automated sign-in and/or sign-out systems.

In general, portable visitor stations as described in this application include a portable computing device, and a visitor application stored on the portable computing device. This application describes techniques for setting up such portable visitor stations at a commercial organization. However, the techniques may be used to set up such portable visitor stations at private organizations, non-profit organizations, or any other organization that may utilize automated sign-in and/or sign-out systems.

In some embodiments, the portable visitor stations may be set up by sending a request to a server to set up the portable visitor station. In one example, the request to set up the portable visitor station may include an identification of the portable computing device that sent the request. In another example, the request to set up the portable visitor station may include an identifier of a version of a visitor application stored on the portable computing device that sent the request. For example, visitor applications may be specific to a type of an organization. For example, a visitor application may be specific to a commercial organization, or a visitor application may be specific to an exhibition. Further, the visitor applications may be made available via a digital application distribution platform (e.g., an "app store"). For example, a visitor application may be made available at the digital application distribution platform for free if the visitor application is a basic version. Likewise, the visitor application may be made available at the digital application distribution platform for a price if the visitor application is a more advanced, or robust version (i.e., the visitor application provides more features).

As such, a user may select a visitor application from a menu of visitor applications that suit the user's needs or requirements. The user may then install the selected visitor application on a portable computing device. For example, a user may choose to install a visitor application on a tablet computer, personal digital assistant, mobile phone, or any other portable computing device capable of installing an application.

In some embodiments, the portable visitor stations may be set up by sending a location at which the portable computing device having the visitor application stored thereon is to be located, sending a list of contacts associated with an organization, and configuring a piece of hardware connected to the portable computing device. For example, during set-up a user may provide the location and/or the list to the portable computing device. The portable computing device may then send the received location and the received list to a server to substantiate the portable visitor station. For example, the server may associate the received list with the received location, and store the associated received list and received location as a new portable visitor station account. In some embodiments, the portable visitor station may be substantiated and set up exclusively by (i.e., consisting of operations of) sending only the received location and the received list to the server. However, in other embodiments, to be set up, the portable visitor station may also configure a piece of hardware connected to the portable computing device. For example, the portable computing device may send an identification of a piece of hardware to a server to configure the piece of hardware in addition to, or along with, the received location and the received list.

In an example, where the portable computing device sends an identification of a piece of hardware to a server, the server may send an instruction to the portable computing device. The instruction may instruct the portable computing device to configure the piece of hardware. For example, the portable computing device may send an identification of a printer connected to the portable computing device to a server, and the server may send an instruction to the portable computing device to configure the printer. In another example, the portable computing device may send an identification of a digital camera connected to the portable computing device to a server, and the server may send an instruction to the portable computing device to configure the digital camera.

In some embodiments, the received location is associated with a commercial facility. Here, the received list may include, for example, one or more names of employees associated with the commercial facility. In other embodiments, the received location may be associated with a commercial exhibition. Here, the received list may include, for example, one or more of names of vendors registered to attend the commercial exhibition.

In some embodiments, the portable visitor stations may already have been set up. Where a portable visitor station is already set up, the portable visitor stations, for example may sign-in a visitor, print a badge, and sign-out a visitor. For example, a portable visitor station may require a visitor to enter a name, a company, a person being visited, and a reason for the visit for the purpose of signing-in to an organization. The portable visitor station may send the sign-in information to a server, and may print a visitor badge for the visitor. The server may send a notification to the person being visited and/or other employees of the organization. The notifications may include, for example, an electronic mail (email) notification, text message notification, a one-way numeric pager message (i.e., a pager message), telephone message, etc. The visitor may sign-out by simply capturing and/or swiping an image of a barcode printed on the badge.

These and other aspects of the portable visitor stations will be described in greater detail below with reference to several illustrative embodiments.

Illustrative Architecture

FIG. 1 illustrates an example architecture 100 which may be used in setting up portable visitor stations. The architecture 100 is described in the context of a user 102 operating a portable computing device 104 to set up a portable visitor station 106 over a network 108. The portable visitor station 106 may provide a self service to sign-in and/or sign-out service for keeping track visitors of a facility. The network 108 may include any one or combination of multiple different types of networks, such as cable networks, the Internet, wireless networks, and cloud computing. Portable computing device 104, meanwhile, may be implemented as any number of portable computing devices, including as a tablet computer, a personal digital assistant (PDA), a mobile phone, and so forth. For example, the portable computing device 104 may be a relatively low cost self contained tablet computer to provide mobile registration.

The user 102 may employ the portable computing device 104 to access an applications store 110 (e.g., a digital application distribution platform or "app store") to select a visitor application from a menu of visitor application(s) 112. For example, the user 102 may select a basic version of a visitor application, or a more robust version having more features. In some embodiments, the basic version of the application may be free, while the more robust versions are available for a price. The basic versions of visitor applications may provide a visitor user interface that signs in and/or out a visitor of a facility, and sends and/or receives sign-in/sign-out information to a server via the network 108. The more robust version of a visitor application may provide multi-facility sign-in/sign-out capabilities, exhibition capabilities, multiple types of notification settings (e.g., email notifications, text message notifications, a pager message notifications, and/or telephone message notifications), security features, etc. In one example, a user may be able to purchase one or more add on features in an a la carte manner, as needed.

The menu of visitor application(s) 112 may include versions of visitor applications specific to a type of an organization. These organizations may include, without limitation, commercial organizations, private organizations, non-profit organizations, or any other organization that may utilize automated sign-in/sign-out systems. For example, a visitor application may be specific to a commercial organization, or a visitor application may be specific to an exhibition.

The applications store 110 may be hosted by one or more server(s) 114 having processing and storage capabilities. In one implementation, the servers might be arranged in a cluster or as a server farm, although other server architectures may also be used to host the applications store 110. The applications store 110 is capable of handling requests from many users and serving application software that can be stored on the portable computing device 104. The server(s) 114 may store or have access to the menu of visitor application(s) 112, as well as a visitor processing service 116. The visitor processing service 116 may be hosted on cite by the facility or hosted by a remote third party sign-in service. While the applications store 110 and the visitor processing service 116 are illustrated in the current example as separate entities, it is to be appreciated that the applications store 110 and the visitor processing service 116 may comprise the same entity or may employ similar or the same functionality in other embodiments. Furthermore, it is to be appreciated that the described techniques themselves may be implemented in a vast number of other environments and architectures.

The visitor processing service 116 may be hosted by one or more server(s) 118 having processing and storage capabilities. The server(s) 118 may store or have access to a data log 120. The data log 120 may store or otherwise have access to information associated with visitor applications selected and/or purchased from the applications store 110 by the user 102. For example, the data log 120 may store the version of the visitor application selected from the applications store 110 by the user 102. Further, the data log 120 may store or otherwise have access to a unique identifier (i.e., identification) associated with the portable computing device 104 that selected and/or purchased the visitor application from the applications store 110.

The visitor processing service 116 may create an account in the data log 120. For example, the visitor service 116 may store or otherwise have access to the visitor applications selected from the applications store 110, and/or the identification of the portable computing device 104 that selected the visitor application for the purpose of creating an account in the data log 120. For example, the visitor processing service 116 may create an account in the data log 120 when the user 102 requests to set up the portable visitor station 106, when the visitor processing service 116 receives a location at which the portable computing device 104 is to be located, and/or when the visitor processing service 116 receives a list of contacts associated with an organization. The visitor processing service 116 may also store, in the data log 120, a user name and/or password of the user 102 selecting the visitor application from the applications store 110. The visitor processing service 116 may store or otherwise have access to the data log 120 for purposes like sending notifications (e.g., visitor notifications, alert notifications, location notifications, etc.), tracking visits (e.g., purpose of visits, frequency of visits, contacts of visits, etc.), tracking visitor location, assigning security levels to contacts, and/or providing barcodes to be printed on visitor badges.

In the illustrated example, the portable computing device 104 is equipped with one or more processors 122, memory 124, one or more network interface(s) 126, and one or more input/output device(s) 128. The memory 124 may include processor-readable instructions, which when executed by the one or more processors 122 perform functions that may include some or all of the functions described herein. In a further example, the functionality of the one or more processors 122 and processor-executable instructions defined in the memory 124 may be performed by a hardware device, such as an application specific integrated circuit (ASIC), a gate array or other hardware-based logic device.

The memory 124 may include software functionality configured as one or more "applications" and/or "modules." However, the applications and/or modules are intended to represent example divisions of the software for purposes of discussion, and are not intended to represent any type of requirement or required method, manner or necessary organization. Accordingly, while various "applications" and/or "modules" are discussed, their functionality and/or similar functionality could be arranged differently (e.g., combined into a fewer number of applications and/or modules, broken into a larger number of applications and/or modules, etc.).

The memory 124 may store a visitor application 130, a unique identifier 132 associated with the portable computing device 104, and data. The unique identifier 132 may facilitate the visitor processing service 116 to create an account in the data log 120. The visitor application 130 may be a basic version, or an upgrade version, of a visitor application selected from the visitor application(s) 112. The visitor application 130 may have access to a set up module 134 and a notification module 136 stored or accessed by the server(s) 118 of the visitor processing service 116.

The visitor application 130 may provide a visitor user interface 138. The visitor user interface 138 may present a set up interface 140 on a display 142 of the portable computing device 104 for the user 102 to interface with and set up the portable visitor station 106. For example, the set up interface 140 may present one or more interface pages on the display 142 presenting information requesting the user 102 to provide a user name, a password, a location at which the portable computing device 104 is to be located, a list of contacts associated with an organization, or any other suitable information to set up the portable visitor station 106. The set up module 134 may receive the user name, password, location, and list, or other information for the purposes of setting up the portable visitor station 106.

After setting up the portable visitor station 106, the visitor user interface 138 may present a sign-in/sign-out interface 144 on the display 142 of the portable computing device 104 for the user 102 to interface with to sign-in and sign-out of an organization. For example, the sign-in/sign-out interface 144 may present one or more interface pages on the display 142 presenting information requesting the user 102 to provide the user's name, company, contact (e.g., person visiting), reason for visit, or any other information necessary to sign-in and/or sign-out the user 102. The notification module 136 may receive the user's name, company, contact (e.g., person visiting), reason for visit, or other information for the purposes of sending notifications (e.g., visitor notifications, alert notifications, location notifications, etc.), tracking visits (e.g., purpose of visits, frequency of visits, contacts of visits, etc.), tracking visitor location, and/or providing barcodes to be printed on visitor badges.

The notification module 136 may provide security features for a facility at which the portable visitor station 106 is set up. For example, for security purposes, the notification module 136 may track the purpose of each visit, frequency of visits of each visitor, and with whom the visitor visited during each visit. Further, for security purposes, the notification module 136 may alert appropriate personnel of each visitor's status. For example, the notification module 136 may alert personnel of a visitor's purpose of visit, duration of visit, and location at the facility. For security purposes, the notification module 136 may provide location tracking. For example, the notification module 136 may track the present location of a visitor at a facility. The visitor processing service 116 may track the present location of the visitor by tracking the present location of an employee escorting the visitor through the facility, by mobile badge scanning a barcode at various access points throughout the facility and/or a radio-frequency identification (RFID) on the visitor badge 150.

The notification module 136 may provide digital signage for the purpose of awareness at the facility. For example, the notification module 136 may provide for displaying images of visitors of the facility via attached televisions, and/or other connected smart devices. Further, the notification module 136 may provide for displaying images of visitors of the facility via a pop-up, a pop-under, an electronic mail, and/or an instant message. For example, a pop-up (e.g., a new web browser window) displaying an image of a visitor of the facility may be present to the visitor's point of contact and/or other appropriate personnel (security personnel, a secretary, human resources, etc.) of associated with the facility.

While FIG. 1 illustrates the visitor processing service 116 including the set up module 134, notification module 136, and data log 120, the portable computing device 104 may include the set up module 134, notification module 136, and data log 120 to perform visitor processing services. For example, the portable computing device may perform notifications itself, without the need for a separate server (e.g., server(s) 118 of the visitor processing service 116).

The network interface(s) 126 may enable the portable computing device 104 to communicate over the network 108 and/or other networks. Communication over the network 108 and/or other networks may be made secure via cryptographic protocols. For example, data may include secure sockets layer (SSL) encryption standard for transmission control protocol (TCP) and internet protocol (IP), commonly known as TCP/IP. The one or more input/output device(s) 128 may include a touch screen (e.g., display 142), a digital camera 146, a mouse, a keyboard, a monitor, a stylus, a sensor, a speaker, or another device capable of receiving input or outputting information.

In the illustrated example, the portable visitor station 106 includes a piece of hardware 148 connected to the portable computing device 104. While FIG. 1 illustrates the piece of hardware 148 being a printer connected to the portable computing device 104, other pieces of hardware may be connected to the portable computing device 104. For example, a camcorder, a video camera, a digital camera, microphone, speaker, biometric scanner, etc. may be connected to the portable computing device 104.

During set up of the portable visitor station 106, the visitor application 130 may provide an identification of the piece(s) of hardware 148 connected to the portable computing device 104 to the visitor processing service 116. For example, the visitor application 130 may provide an identification of the printer connected to the portable computing device 104 to the visitor processing service 116 for the purpose of receiving an instruction to configure the printer.

The printer may provide for printing a visitor badge 150. The visitor badge 150 may include a photo 152 of a visitor, a barcode 154, a visitor name, a company name, a contact name, a visitor code, or any other additional information printed on the visitor badge 150. For example, after setting up the portable visitor station 106, the printer may print a photo 152 of the user 102, along with a matrix (2-dimensional) barcode on the visitor badge 150. As used herein, the term barcode includes standard barcodes composed of multiple parallel lines of varying thicknesses and spacing, as well as quick response (QR) codes, or any other optically machine readable codes. The barcode 154 may provide for signing in and/or signing out a user, providing encrypted tracking data, controlling access at the facility, mobile badge scanning, augmented reality, linking to an advertisement, etc. For example, the barcode 154 may expedite a user signing out by simply capturing an image of the barcode 154 at the portable visitor station 106. Further, the barcode 154 may provide for a mobile phone to present augmented reality of the facility and/or products to a user. Further, the barcode 154 may provide for an advertisement of products and/or events to be presented on a mobile phone (e.g., products offered for sale by an organization of the facility).

The visitor badge 150 may be disposable. For example, the printer may print the visitor badge 150 using disappearing ink or expiring ink (e.g., ink that is visible for a period of time without the intention of being made visible again) on continuous roll stock paper. Additionally or alternatively, the visitor badge 150 may include a radio-frequency identification (RFID) tag for the purposes of sign-in and/or sign-out, tracking visitor location, controlling access, mobile badge scanning, etc.

The printer may provide for printing in color and/or in black and white. The printer may provide for printing on continuous roll stock paper, individual sheets, or the like.

Illustrative Set Up Interface Pages

Figure 2:
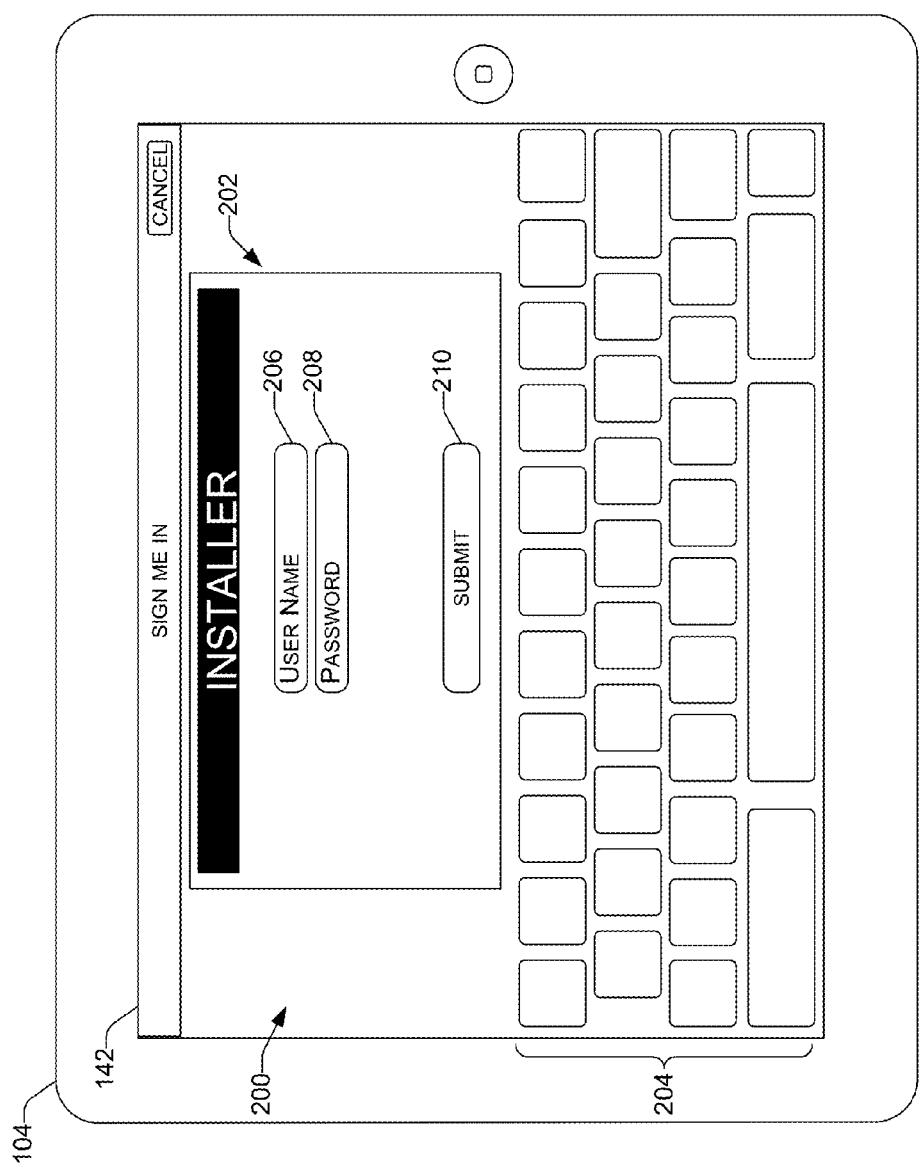
FIG. 2 illustrates a screen rendering of an example interface page served by the visitor application stored on the portable computing device of FIG. 1. Here, the example interface page includes an authentication widget provided by the visitor application stored on the portable computing device of FIG. 1. The authentication widget allows the user to enter a user name and password for the purpose of requesting to set up the portable visitor station of FIG. 1.

FIG. 2 illustrates an example screen rendering of an interface page 200 served by the set up interface 140 of the visitor application 130 stored on the portable computing device 104 of FIG. 1. The interface page 200 may be presented on the display 142 (e.g., a touchscreen) of the portable computing device 104 (e.g., a tablet computer). Here, the example interface page 200 includes an authentication widget 202 and/or a keyboard 204 provided by the visitor application 130. The authentication widget 202 and keyboard 204 allows the user 102 to enter a user name and password for the purpose of sending a request to set up the portable visitor station 106 of FIG. 1.

The authentication widget 202 may include text box(s) 206 and 208, and an icon 210 entitled "Submit." The text box 206 may allow a user or administrator, such as user 102, to enter a user name, while the text box 208 may allow a user to enter a password. Once the user name and/or password are entered, the user 102 may then select the icon 210 to request to set up the portable visitor station 106. For example, after the user 102 provides a user name and password, the visitor application 130 may send the provided user name and password to the visitor processing service 116 as a request to set up the portable visitor station 106. Further, the visitor application 130 may send the unique identifier 132 associated with the portable computing device 104 and an identifier of a version of the visitor application 130 stored on the portable computing device 104 as a request to set up the portable visitor station 106.

Figure 3:
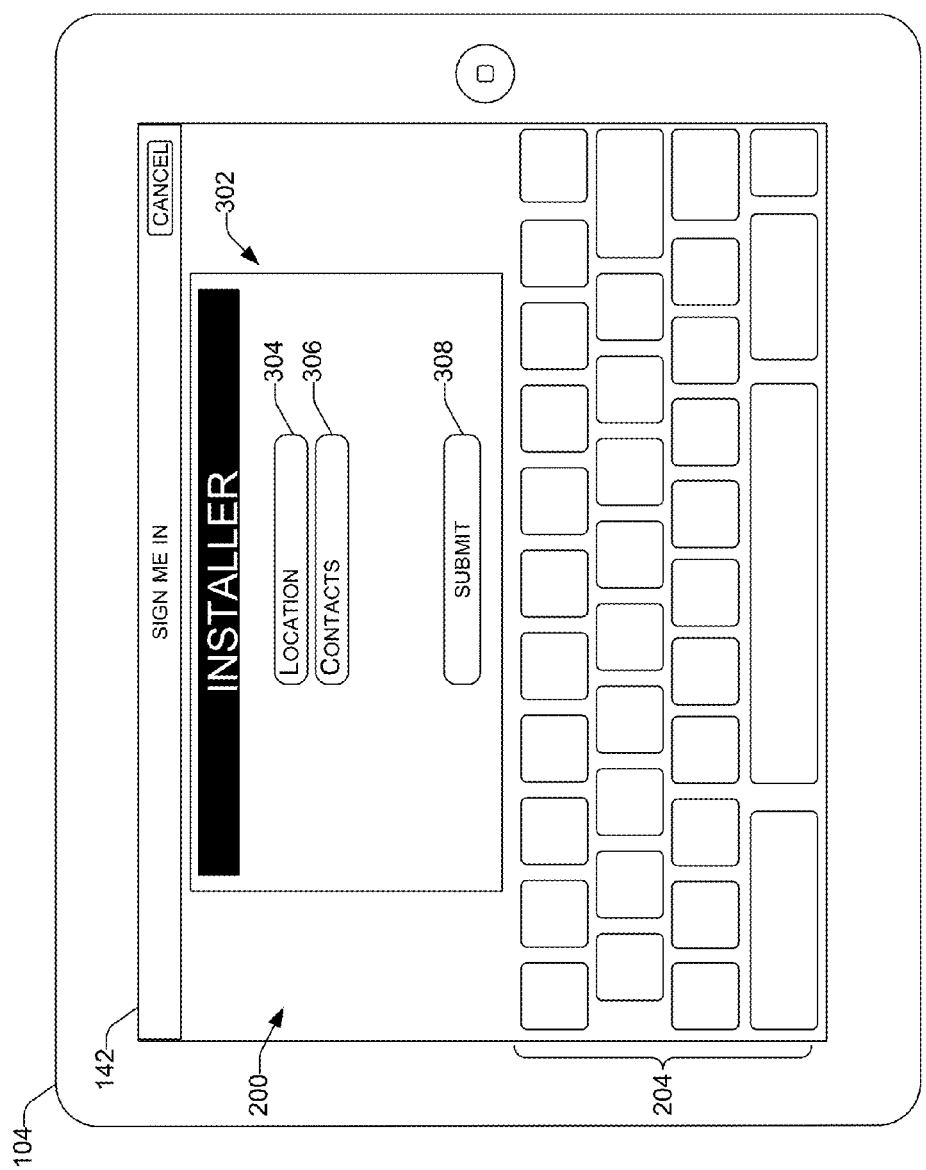
FIG. 3 illustrates a screen rendering of an example interface page after the user has successfully requested to set up the portable visitor station of FIG. 1. Here, the example interface page includes a substantiation widget provided by the visitor application stored on the portable computing device of FIG. 1. The substantiation widget allows the user to enter a location at which the portable computing device is to be located (e.g., "main entrance," service entrance," etc.), and a list of contacts associated with an organization for the purpose of setting up the portable visitor station of FIG. 1.

FIG. 3 illustrates the example screen rendering of the interface page 200 from FIG. 2 after the user has successfully requested to set up the portable visitor station 106. Here, the example interface page 200 includes a substantiation widget 302 and/or the keyboard 204 provided by the visitor application 130. The substantiation widget 302 and keyboard 204 allows the user 102 to enter a location at which the portable computing device 104 is to be located, and a list of contacts associated with an organization for the purpose of setting up the portable visitor station 106.

The substantiation widget 302 may include text box(s) 304 and 306, and an icon 308 entitled "Submit." The text box 304 may allow a user, such as user 102, to enter a location at which the portable computing device 104 is to be located, while the text box 306 may allow a user to enter a list of contacts associated with an organization. For example, a user may enter a location associated with a commercial facility. The location may be a physical address of a commercial facility, and/or an identification of an area (e.g., a lobby, waiting room, main entrance, east entrance, west entrance, etc.) within the commercial facility. In the example where the location is associated with a commercial facility, the list of contacts may include one or more names of employees associated with the commercial facility. The visitor processing service 116 may assign a security level to each contact on the list of contacts. For example, the visitor processing service may assign a security level to each employee on the list of contacts. Further, the location may be associated with a commercial exhibition. For example, the location may be a physical address of a trade fair, and/or an identification of an area at the trade fair. In the example where the location is associated with a commercial exhibition, the list of contacts may include one or more names of vendors registered to attend the commercial exhibition.

The list of contacts associated with an organization may be provided by the user manually or automatically. For example, a user may manually type the list of contacts, via keyboard 204, into the text box 306. Alternatively, or in addition to manually typing the list of contacts, the user may choose to download, exchange, sync, etc., some or all of the list of contacts. For example, a user may choose to download a list of contacts from a client-server (e.g., an email server, a database server, etc.), or from a data storage device (e.g., disk storage, flash memory, etc.). Once the location and/or the list are entered, the user 102 may then select the icon 308 to send the location and list to the visitor processing service 116 for the purposes of substantiating the portable visitor station 106. For example, after the user 102 provides a location at which the portable computing device 104 is to be located and a list of contacts associated with an organization, the visitor application 130 may send the provided location and the provided list to the visitor processing service 116 to be associated with each other, and stored as an account in the data log 120.

Illustrative Sign-in/Sign-Out Interface Pages

Figure 4:
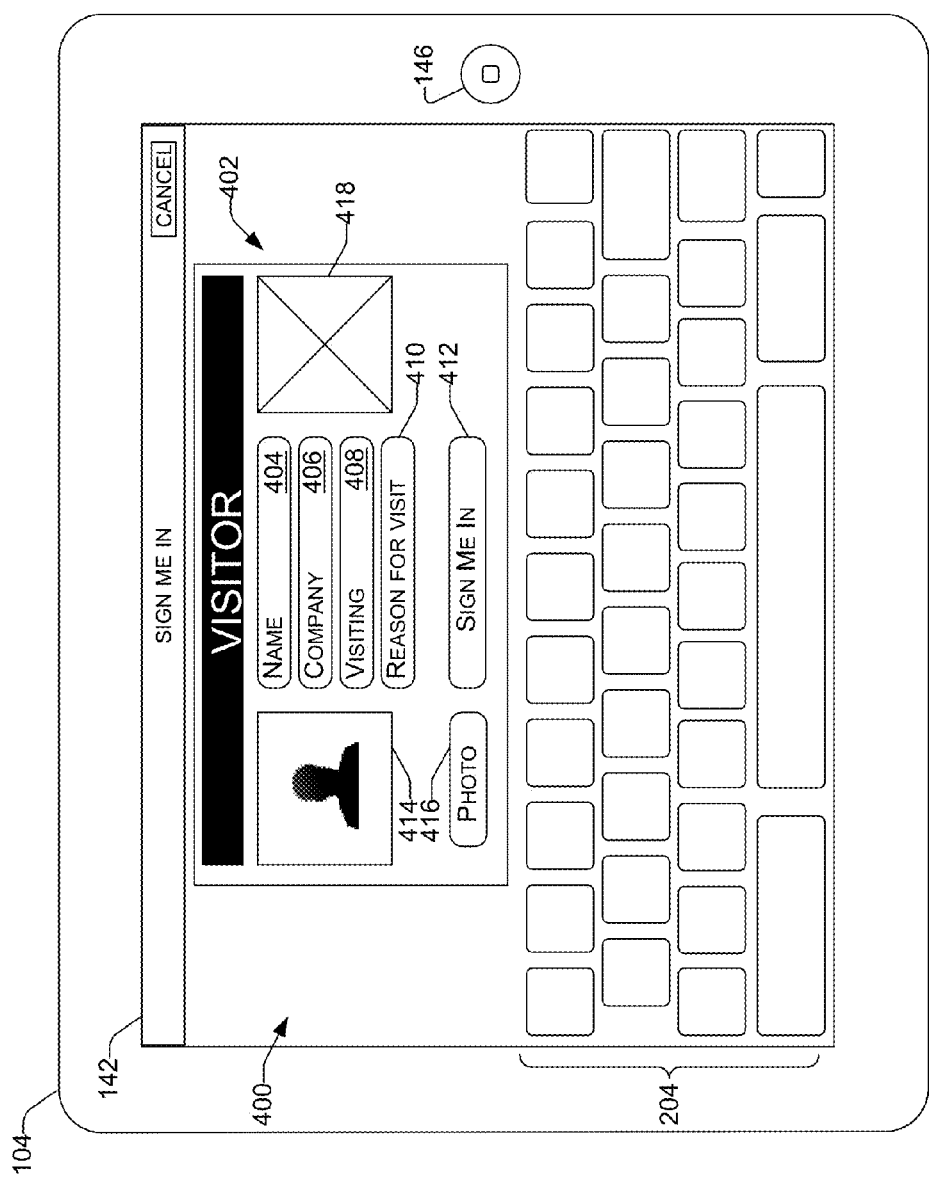
FIG. 4 illustrates a screen rendering of an example interface page served by the visitor application stored on the portable computing device of FIG. 1 after the portable visitor station has been set up. Here, the example interface page includes a sign-in widget provided by the visitor application stored on the portable computing device of FIG. 1. The sign-in widget allows the user to enter his or her name, company, person visiting, and reason for the visit for the purpose of signing into an organization.

FIG. 4 illustrates an example screen rendering of an interface page 400 served by the sign-in/sign-out interface 144 of the visitor application 130 stored on the portable computing device 104 of FIG. 1 after the portable visitor station 106 has been set up. The interface page 400 may be presented on the display 142 (e.g., touchscreen) of the portable computing device 104 (e.g., a tablet computer). Here, the example interface page 400 includes a sign-in widget 402 and/or the keyboard 204 provided by the visitor application 130. The sign-in widget 402 and keyboard 204 allows the user 102 to enter his or her name, company, person visiting, and reason for the visit for the purpose of signing into an organization.

The sign-in widget 402 may include text box(s) 404, 406, 408, 410, and an icon 412 entitled "Sign Me In." The text box 404 may allow a user, such as user 102, to enter his or her name. The text box 406 may allow a user to enter his or her company, or place of employment. The text box 408 may allow a user to enter a name of a person a user is visiting, or a name of a point of contact. Further, the text box 408 may provide for searching for an employee of an organization a user is visiting. For example, the text box 408 may allow a user to enter a first and/or a last name of a person a user is visiting, and the sign-in widget 402 may present candidate employees. For example, the sign-in widget may present, in a drop-down list, an alphabetical list of candidate employees, and/or a photo identification of each employee.

The text box 410 may allow a user to enter a reason for his or her visit. Once the user's name, company, person visiting, and reason for visit are entered, the user 102 may then select the icon 412 to request to be signed in. For example, after the user 102 provides his or her name, company, person visiting, and reason for visit, the visitor application 130 may send the provided name, company, person visiting, and reason for visit to the visitor processing service 116 to store in the data log 120. For example, the visitor processing service 116 may store the visitor's name, company, person visiting, and reason for visit for the purposes like sending notifications (e.g., visitor notifications, alert notifications, location notifications, etc.), tracking visits (e.g., purpose of visits, frequency of visits, contacts of visits, etc.), tracking visitor location, assigning security levels to contacts, and/or providing barcodes to be printed on visitor badges.

The interface page 400 may include a digital image 414 of a user, such as user 102 in view of the digital camera 146. For example, the visitor application 130 may present information, on the interface page 400, requesting a user to take a picture for the purpose of printing a digital photo, such as the photo 152 printed on the visitor badge 150. A user may present himself or herself in view of the digital camera 146 and capture the digital image 414 via the display 142. Once the user's digital image 414 is found to be acceptable to the user, the user may then select an icon 416 to capture the digital image 414.

The interface page 400 may include a barcode 418 (e.g., a matrix (2-dimensional) barcode). For example, the visitor application 130 may present a matrix (2-dimensional) barcode, on the interface page 400, for preview by a user, for the purpose of printing the barcode 150 on the visitor badge 150. The barcode 418 may be provided by the notification module 136 to the visitor application 130.

Figure 5:
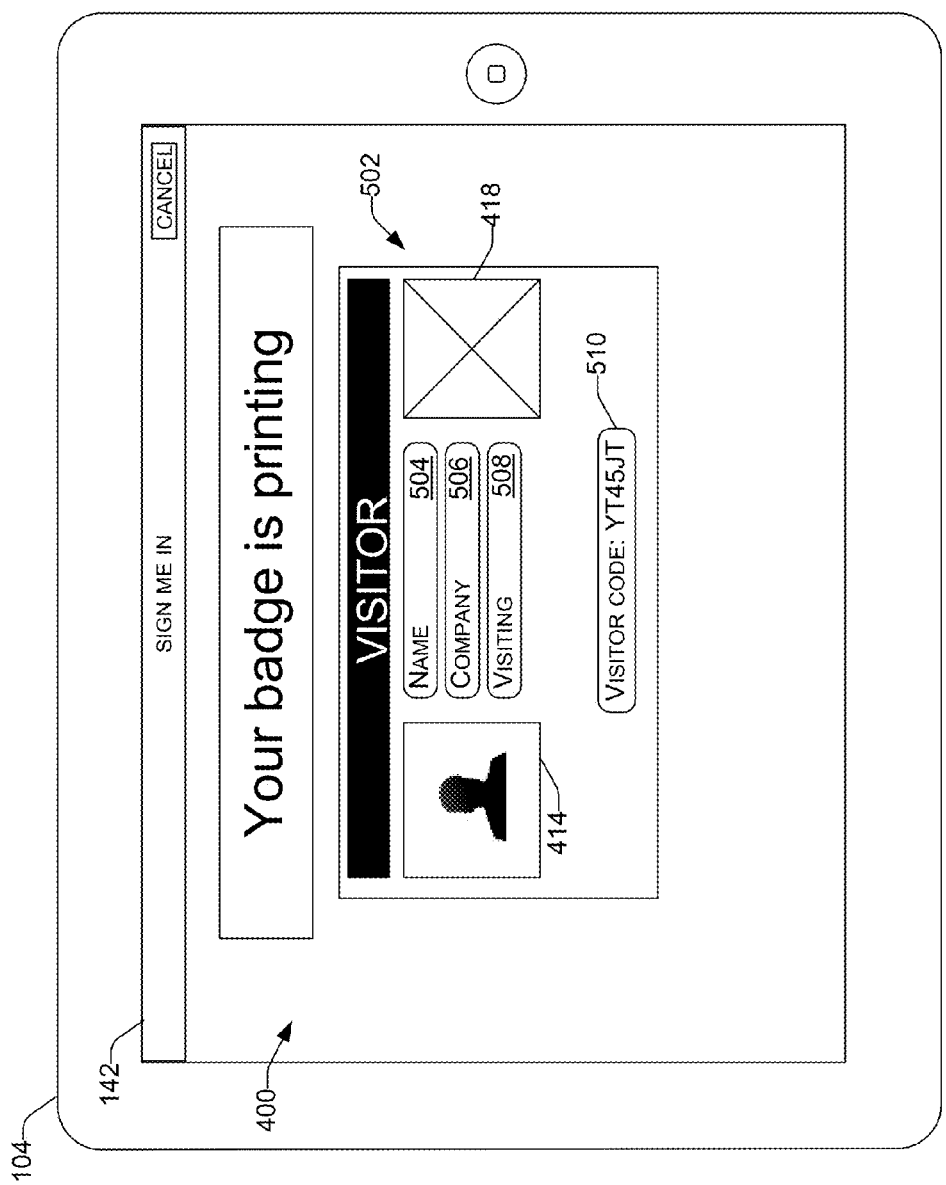
FIG. 5 illustrates a screen rendering of an example interface page served by the visitor application stored on the portable computing device of FIG. 1 after the user has filled out all the fields provided by the sign-in widget provided of the visitor application stored on the portable computing device of FIG. 1. Here, the example interface page includes a badge widget provided by the visitor application stored on the portable computing device of FIG. 1. The badge widget notifies the user that his or her badge is printing.

FIG. 5 illustrates an example screen rendering of an interface page 500 served by the visitor application 130 after the user has filled out all the fields provided by the sign-in widget 402. The interface page 500 may be presented on the display 142 (e.g., touchscreen) of the portable computing device 104 (e.g., a tablet computer). Here, the example interface page 500 includes a badge widget 502 provided by the visitor application 130. The badge widget 502 notifies a user, such as user 102, that his or her badge 150 is printing. The badge widget 502 allows the user 102 to preview the badge 150.

The badge widget 502 may include the text box(s) 504, 506, 508, and 510. The text box 504 may present a user's name as entered by the user via the sign-in widget 402. The text box 506 may present a user's company, or place of employment, as entered by the user via the sign-in widget 402. The text box 508 may present the name of the person the user is visiting, or the name of the user's point of contact, as entered by the user via the sign-in widget 402. The text box 510 may present a visitor code associated with a user, such as user 102, and a visit. For example, the text box 510 may present a first visitor code associated with a user and his or her first visit, and at a time of a second visit, the text box 510 may present a second visitor code associated with the visitor and his or her second visit. The visitor code may be provided by the notification module 136 to the visitor application 130.

The interface page 500 may include the captured digital image 414 to be printed as the photo 152 on the visitor badge 150. For example, the visitor application 130 may present the captured digital image 414 on the interface page 500 as captured by the user via the sign-in widget 402.

The interface page 500 may include the barcode 418 to be printed as the barcode 150 on the visitor badge 150. For example, the visitor application 130 may present a matrix (2-dimensional) barcode, on the interface page 500 to be printed as the barcode 150 on the visitor badge 150.

Illustrative Flow Diagrams

Figure 6:
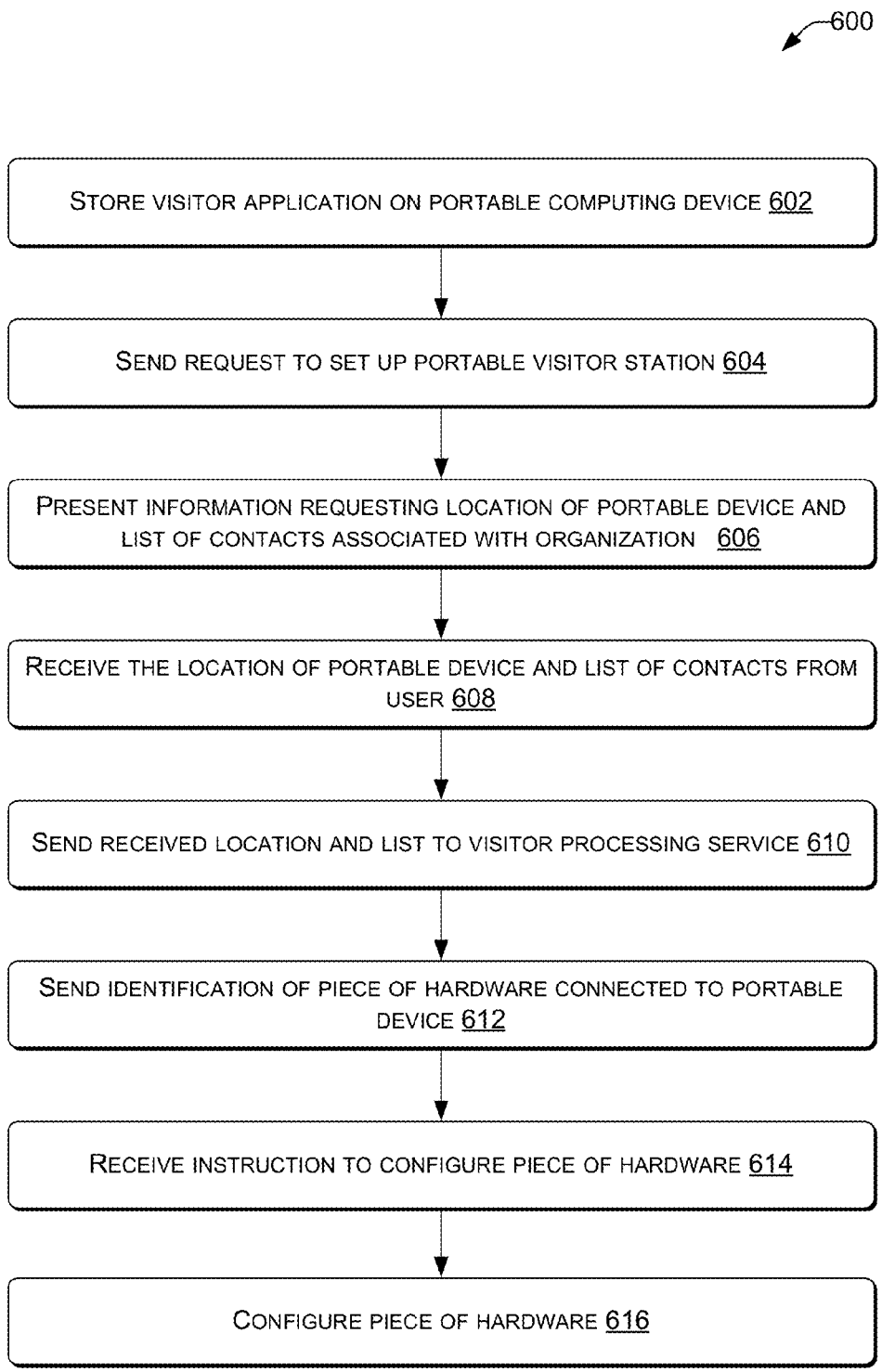
FIGS. 6-7 illustrate an example process of setting up a portable visitor station that may be implemented by the architecture of FIG. 1 and/or other architectures.
Figure 7:
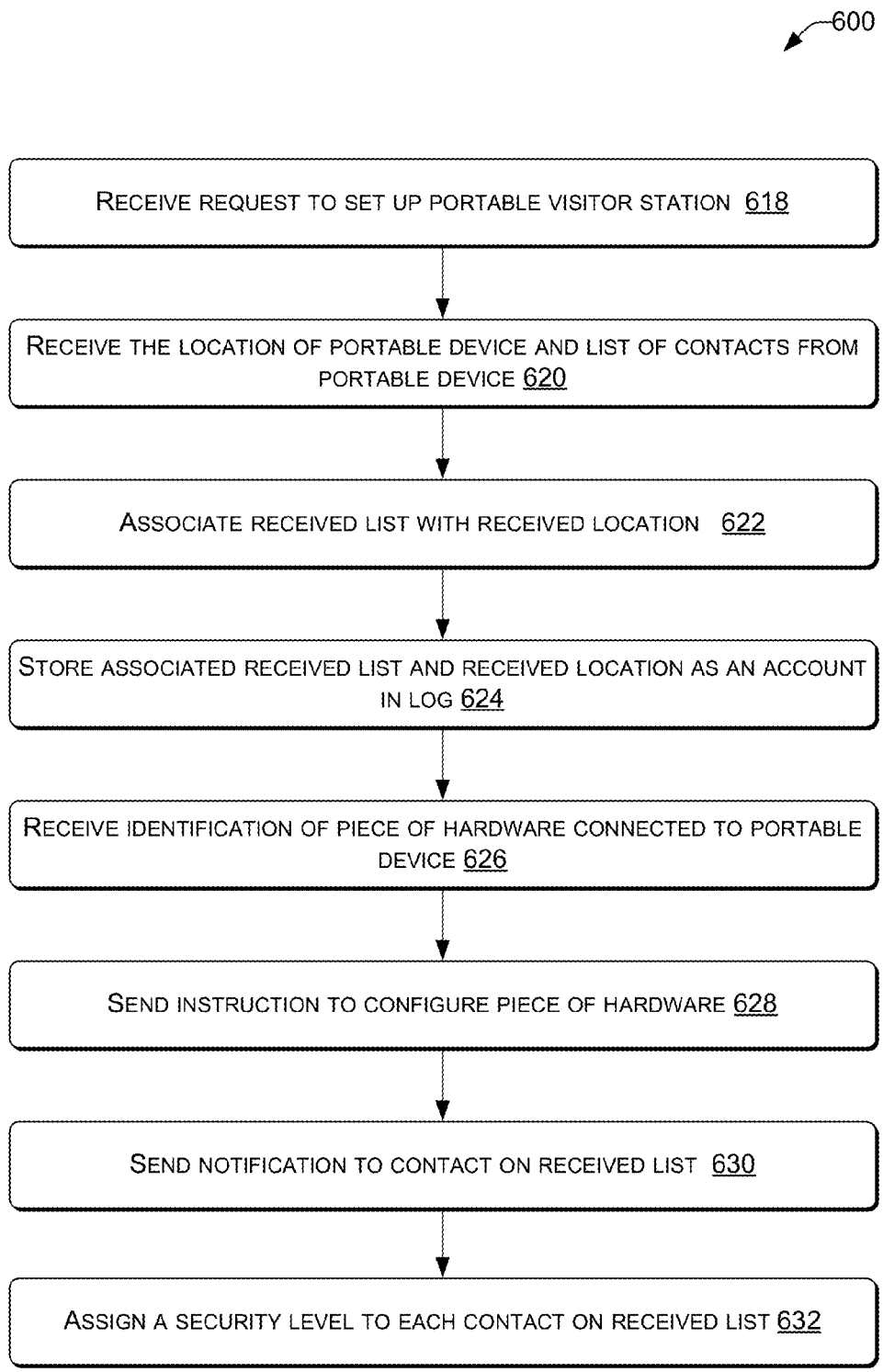

FIGS. 6-7 illustrate an example process of setting up a portable visitor station (e.g., portable visitor station 106) that may be implemented by the architecture of FIG. 1 and/or other architectures. Process 600 includes operation 602, which represents a user (e.g., user 102) operating a computing device to store a visitor application (e.g., visitor application 130) on a portable computing device (e.g., portable computing device 104). For example, a user may navigate to an application store (e.g., applications store 110) and select and/or purchase a visitor application from among a menu of visitor application(s) (e.g., visitor application(s) 112). For example, a user may select a basic version of a visitor application for free, or purchase a more robust version having more features for a price and store the visitor application on the portable computing device.

Next, operation 604 represents the user operating the portable computing device to send a request to a visitor processing service (e.g., visitor processing service 116) to set up the portable visitor station. The request to set up the portable visitor station may include an identification (e.g., unique identifier 132) of the portable computing device that sent the request. Further, the request to set up the portable visitor station may include an identifier of a version of the visitor application stored on the portable computing device. Further, the request to set up the portable visitor station may also include a user name and/or password provided by the user in text box 206 and/or text box 208.

At operation 606, the visitor application stored on the portable computing device may present an interface page (e.g., interface page 200) on a display (e.g., display 142) of the portable computing device. The interface page presenting information requesting a location at which the portable computing device is to be located (e.g., "Location" text box 304), and a list of contacts associated with the organization (e.g., "Contacts" text box 306). Operation 608 represents receiving the location the portable computing device is to be located and the list of contacts from the user.

At operation 610, the visitor application may send the received location and the received list to the visitor processing service to substantiate the portable visitor station. For example, a server (e.g., server(s) 118) may associate the received list with the received location, and store the associated received list and received location as a new portable visitor station account. In some embodiments, the portable visitor station may be substantiated and set up exclusively by sending only the received location and the received list to the server.

Process 600 may continue with operation 612 which represents sending an identification of a piece of hardware (e.g., piece of hardware 148) connected to the portable computing device 104. For example, the visitor application may send an identification of a printer to a set up module (e.g., set up module 134). At operation 614, the visitor application may receive an instruction to configure the piece of hardware connected to the portable computing device. Operation 614 may be followed by operation 616 which represents configuring the piece of hardware connected to the portable computing device.

Process 600 may continue with operation 618 which represents the visitor processing service receiving the request to set up the portable visitor station from the portable computing device. Operation 618 may be followed by operation 620 which represents the visitor processing service receiving the location the portable computing device is to be located and the list of contacts associated with the organization.

Process 600 may continue at operation 622 which represents the visitor processing service associating the received list with the received location. Operation 622 may be followed by operation 624 which represents the visitor processing service storing the associated received list and received location as an account in a log (e.g., data log 120).

Process 600 may include operation 626 which represents the visitor processing service receiving the identification of the piece of hardware connected to the device. Operation 628 may follow operation 626 which represents sending, to the portable computing device, an instruction to configure the piece of hardware connected to the portable computing device.

Process 600 may include operation 630 which represents the visitor processing service sending a notification to a contact on the received list. Process 600 may be complete at operation 632 which represents the visitor processing service assigning a security level to each contact on the received list.

Illustrative Administrative Interface Pages

FIGS. 8-13 illustrate example screen renderings of interface pages served by the visitor processing service of FIG. 1 to a computing device of a user. Here, the example interface pages may display information stored in the data log 120 of the visitor processing service to an administrative user, such as user 102. The interface pages may be presented on a display of a personal computing device of the administrative user. Further, the interface pages may be presented on the display 142 of the portable computing device 104.

Figure 8:
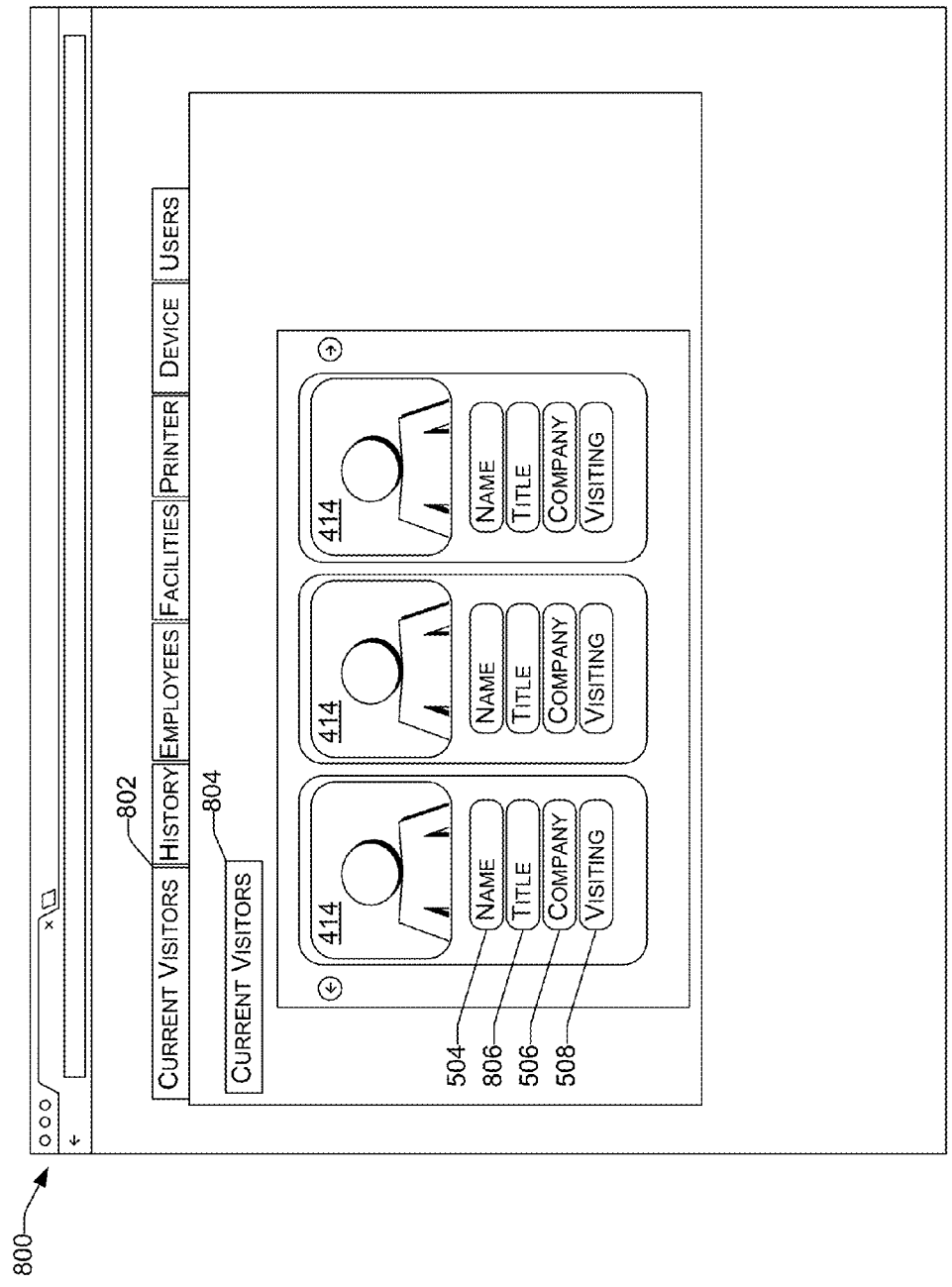
FIGS. 8-13 are example screen renderings of example interface pages served by the visitor processing service of FIG. 1 to a computing device of a user. Here, the example interface pages may display information stored in the data log 120 of the visitor processing service to an administrative user.

FIG. 8 illustrates an example screen rendering of an interface page 800 served by the visitor processing service 116 of FIG. 1 after the user selected the current visitors tab 802. The interface page 800 may display the current visitors 804 of an organization. The interface page 800 may display the digital image(s) 414 of each current visitor. The interface page 800 may include the text box 504 that presents the current visitor's name, the text box 506 that present the current visitor's company, and the text box 508 that may present the name of the person the current visitor is visiting, as entered by the visitor via the sign-in widget 402. The interface page 800 may also present a text box 806 that may present a visitor's title as entered by the visitor via the sign-in widget 402. The interface page 800 may provide, to an administrative user, awareness of visitors currently visiting a facility of the organization.

Figure 9:
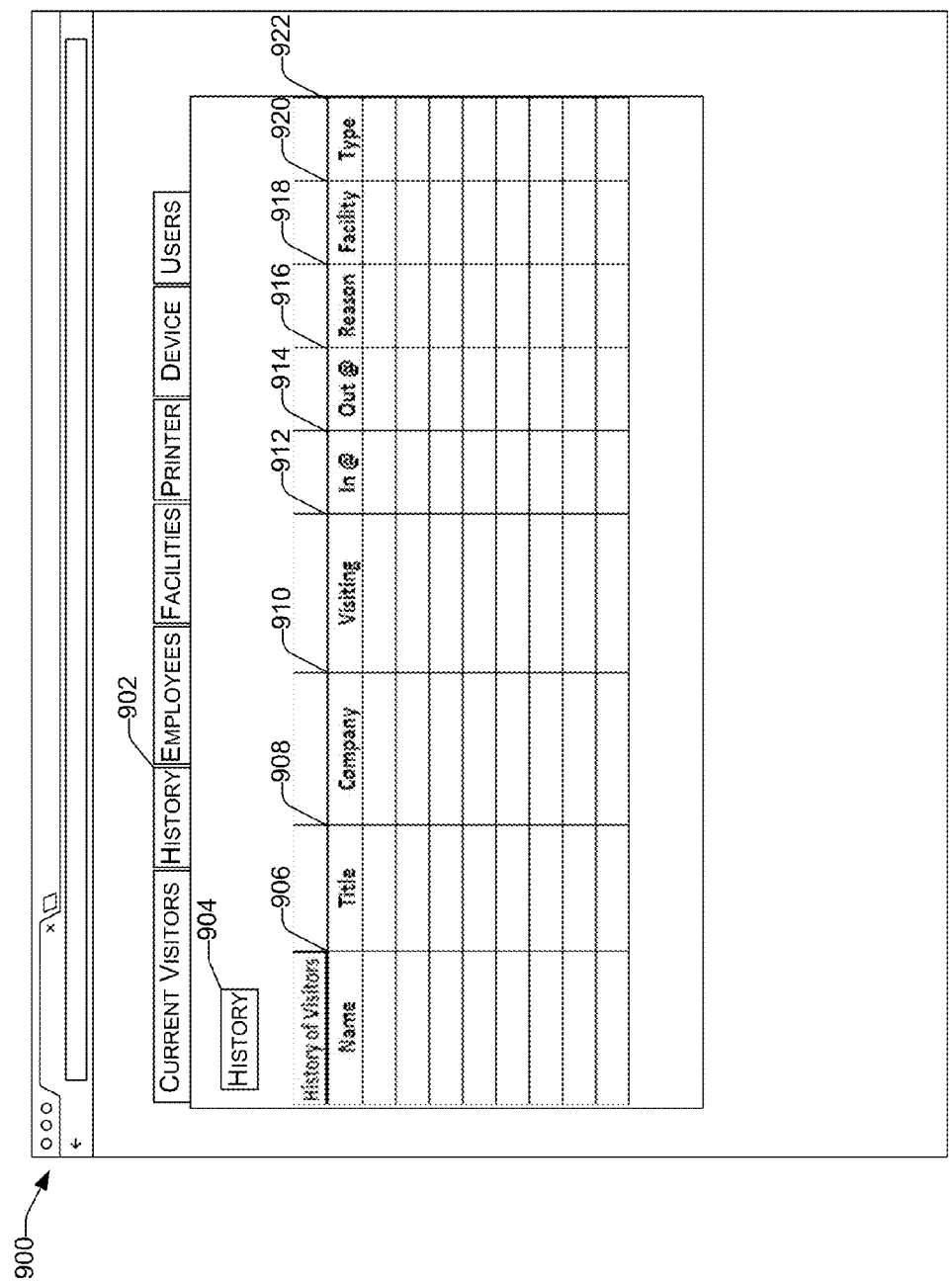

FIG. 9 illustrates an example screen rendering of an interface page 900 served by the visitor processing service 116 of FIG. 1 after the user selected a history tab 902. Here, the example interface page 900 may display a history of visitors table 904. The history of visitors table 904 may include a visitor's name column 906, a visitor's title column 908, a visitor's company column 910, a visitor's contact column 912, a visitor's time in column 914, a visitor's time out column 916, a visitor's purpose of visit column 918, a facility column 920, and a visitor's type column 922 (e.g., guest, vendor, etc.). The columns 906-922 may present the information as entered by the user via the sign-in widget 402. For example, column 906 may present users names as entered by each user in text box 404 of FIG. 4.

Figure 10:
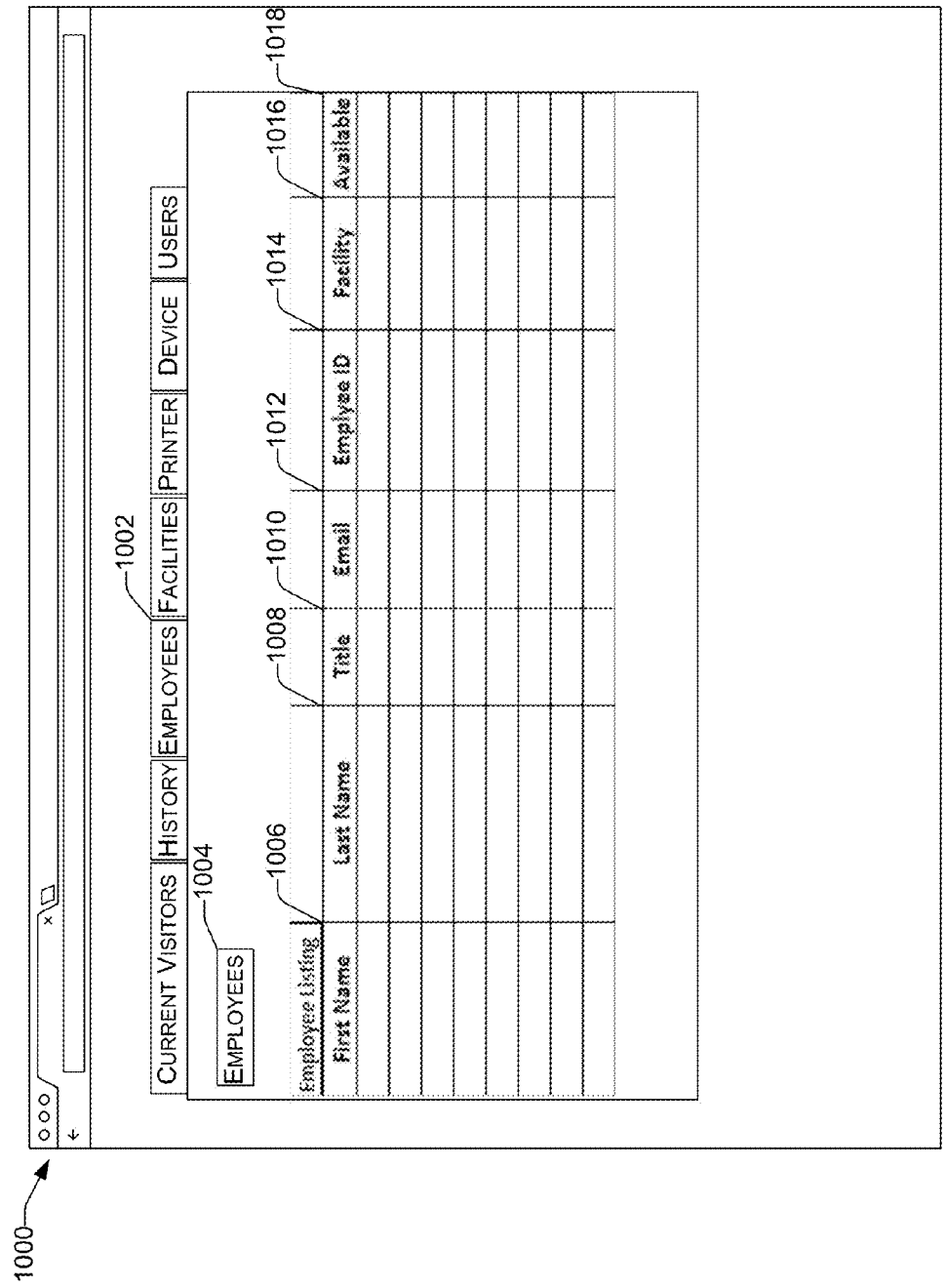

FIG. 10 illustrates an example screen rendering of an interface page 1000 served by the visitor processing service 116 of FIG. 1 after the user selected an employee tab 1002. Here, the example interface page 1000 may display an employee table 1004. The employee table 1004 may include an employee first name column 1006, an employee last name column 1008, an employee title column 1010, an employee email column 1012, an employee first identification (ID) column 1014, an employee facility column 1016, and an employee availability column 1018. The employee table 1004 may be completed manually or automatically. For example, an administrator may manually type in the information to complete the employee table 1002, or the administrator may choose to download, exchange, sync, etc., an existing employee list. For example, an administrator may choose to download an existing employee list from a client-server (e.g., exchange server), or from a data storage device (e.g., disk storage, flash memory, etc.).

Figure 11:
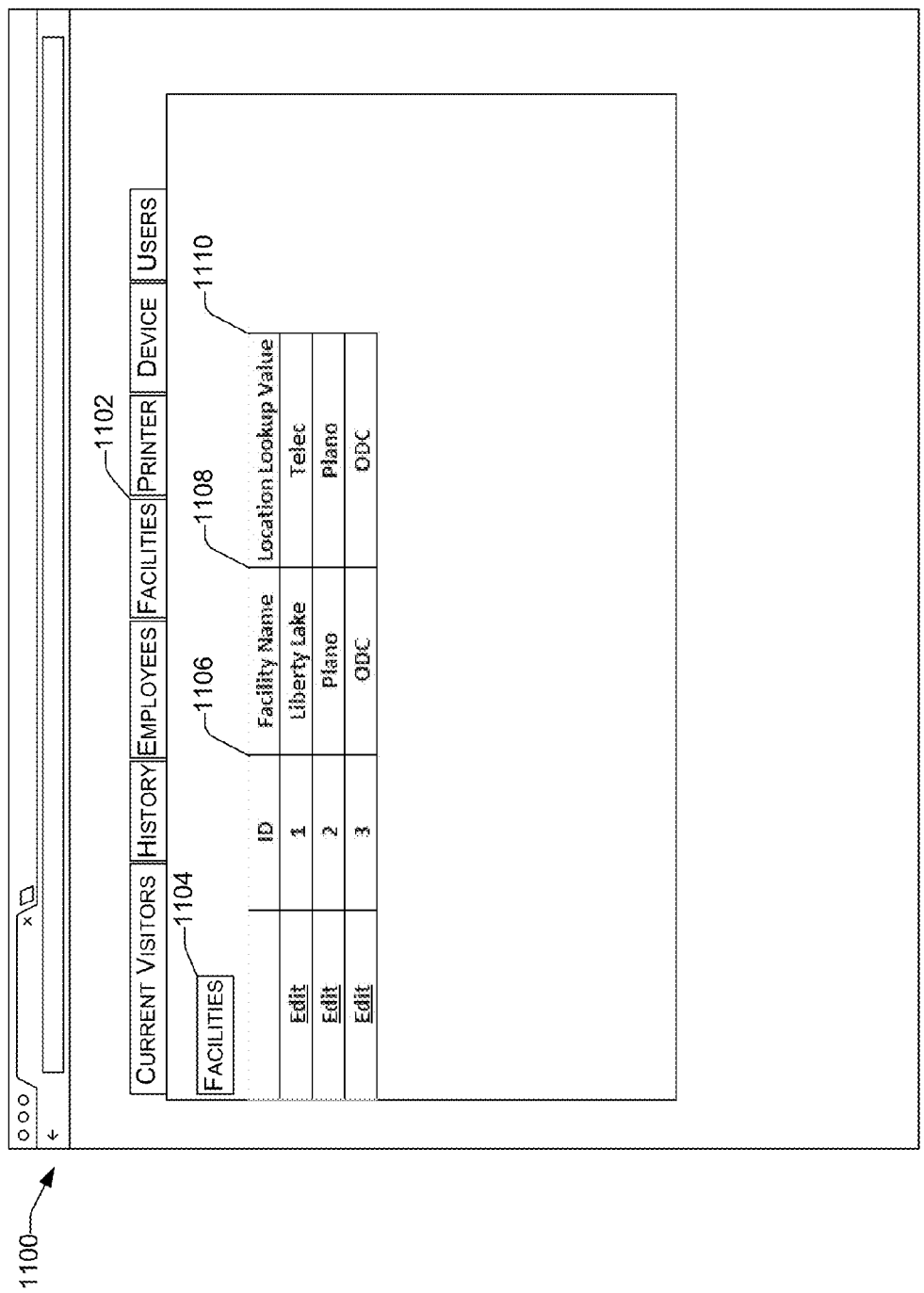

FIG. 11 illustrates an example screen rendering of an interface page 1100 served by the visitor processing service 116 of FIG. 1 after the user selected a facilities tab 1102. Here, the example interface page 1100 may display a facilities table 1104. The facilities table 1104 may include a facility identification (ID) column 1106, an facility name column 1108, and a location lookup column 1110. The facilities table 1104 may be completed manually or automatically. For example, an administrator may manually type in the information to complete the facilities table 1104, or the administrator may choose to download, exchange, sync, etc., an existing facilities list. For example, an administrator may choose to download an existing facilities list from a client-server (e.g., exchange server), or from a data storage device (e.g., disk storage, flash memory, etc.).

Figure 12:
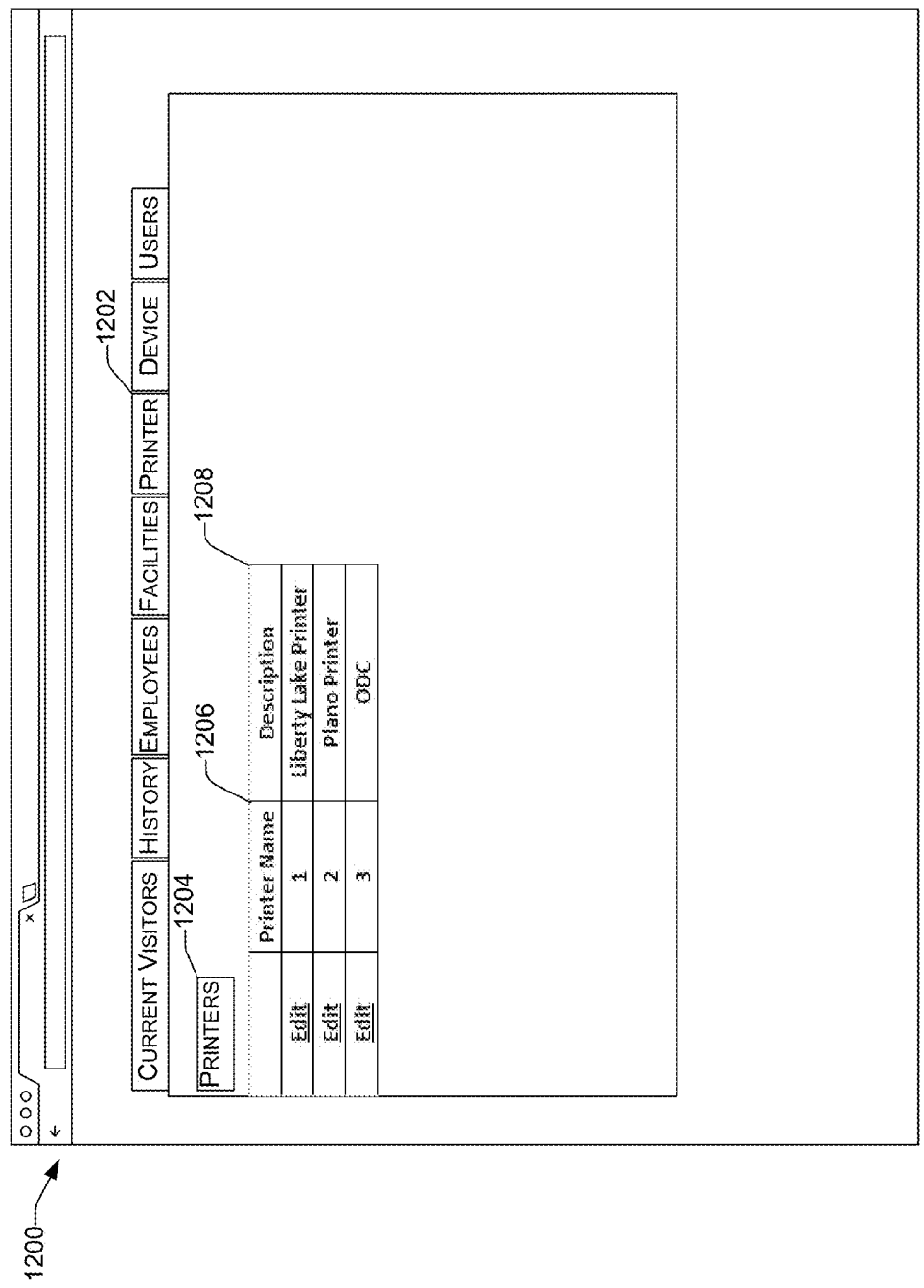

FIG. 12 illustrates an example screen rendering of an interface page 1200 served by the visitor processing service 116 of FIG. 1 after the user selected a printers tab 1202. Here, the example interface page 1200 may display a printers table 1204. The printers table 1204 may include a printer name column 1206, and a printer description column 1208. The printers table 1204 may be completed manually or automatically. For example, an administrator may manually type in the information to complete the printers table 1204, or the visitor processing service 116 may complete the printers table 1204. For example, as discussed above, the visitor application 130 stored on the portable computing device 104 may send the identification of a piece of hardware (e.g., printer hardware 148) connected to the portable computing device 104. The set up module 134 may receive these reported identifications and store them in the data log 120. The visitor processing service 116 may complete the printers table 1204 with the hardware information stored in the data log 120.

Figure 13:
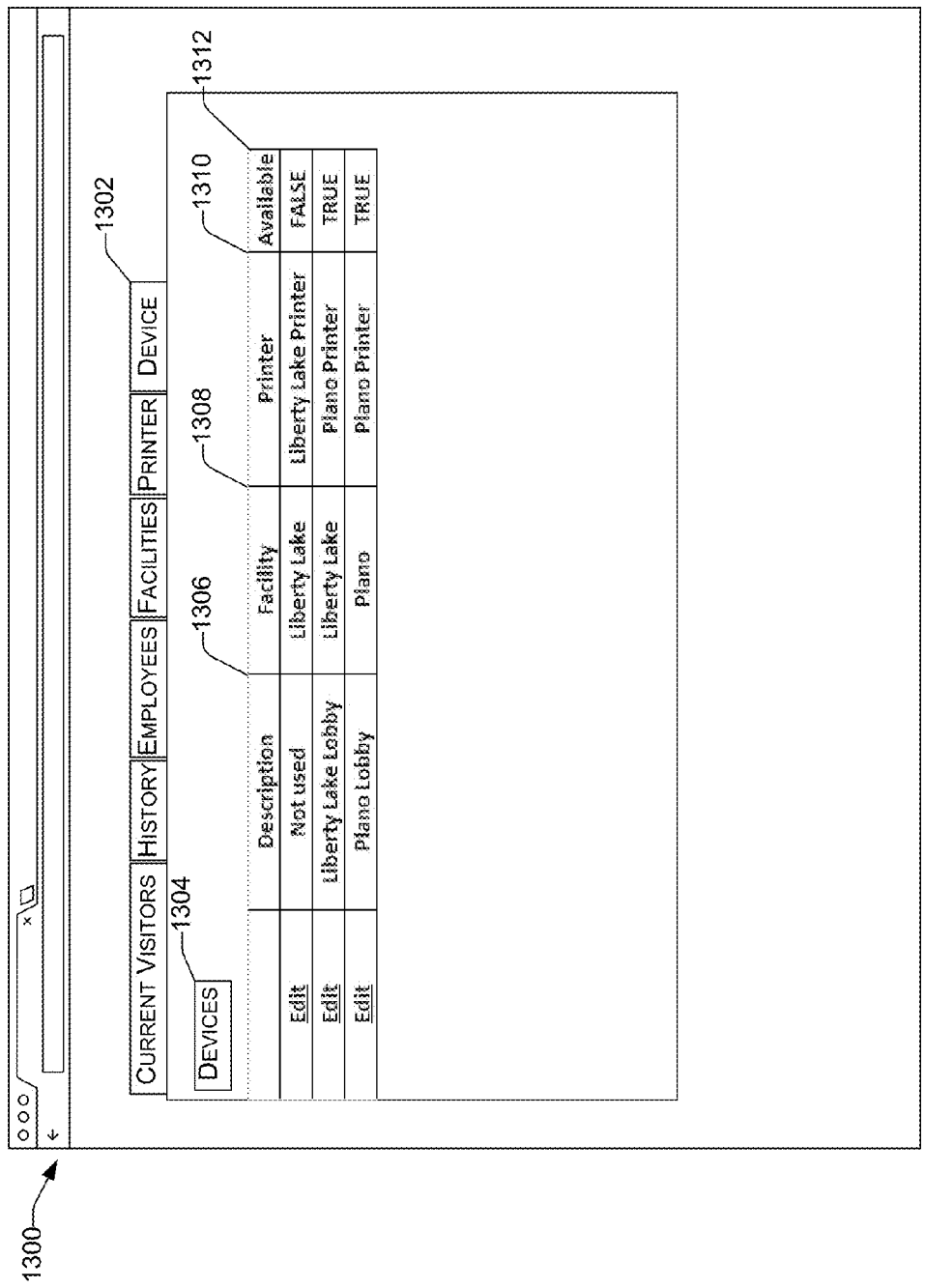

FIG. 13 illustrates an example screen rendering of an interface page 1300 served by the visitor processing service 116 of FIG. 1 after the user selected a device tab 1302. Here, the example interface page 1300 may display a devices table 1304. The devices table 1304 may include a description column 1306, a facility column 1308, a printer column 1310, and an available column 1312. The description column 1306 may include information identifying a printer's designated use. For example, the description column 1306 may identify a printer as is not being used, or that a printer is dedicated to a particular location in a facility (e.g., a lobby at a facility). The facility column 1308 may include information identifying a facility the printer is located. The printer column 1310 may identify a printer's name or description. For example, the printer column 1310 may present the information completed in the description column 1208 of the printers table 1204. The devices table 1304 may be completed manually or automatically. For example, an administrator may manually type in the information to complete the devices table 1304, or the visitor processing service 116 may complete the devices table 1304. For example, as discussed above, the visitor application 130 stored on the portable computing device 104 may send the unique identifier 132 associated with the portable computing device 104 and an identifier of a version of the visitor application 130 stored on the portable computing device 104 as a request to set up the portable visitor station 106. The set up module 134 may receive these reported unique identifiers of portable computing devices and versions of visitor applications and store them in the data log 120. The visitor processing service 116 may complete the devices table 1304 with the unique identifiers of portable computing devices and versions of visitor applications information stored in the data log 120.

CONCLUSION

Although the disclosure uses language specific to structural features and/or methodological acts, the claims are not limited to the specific features or acts described. Rather, the specific features and acts are disclosed as illustrative forms of implementing the invention. For example, the various embodiments described herein may be rearranged, modified, and/or combined. As another example, one or more of the method acts may be performed in different orders, combined, and/or omitted entirely, depending on the portable visitor station being set up.

What is claimed is:

1. A computer-implemented method comprising:
under control of a portable computing device comprising one or more processors configured with executable instructions,
storing, on the portable computing device, a visitor application that provides a user interface (UI) to a user of the portable visitor station;
sending a request to a server to set up the portable visitor station, the request including:
an identification of the portable computing device that sent the request; and
an identifier of a version of the visitor application stored on the portable computing device;
sending an identification of a printer connected to the portable computing device;
receiving an instruction to configure the printer connected to the portable computing device;
configuring the printer connected to the portable computing device according to the received instruction;
receiving, via the UI, user input to sign in a visitor;
based at least in part on the user input, sending a request to send a notification to an individual that the visitor has signed in, the notification including an image of the visitor to be displayed by a smart device and a display screen within a facility of an organization, wherein the image is to be displayed by the smart device and the display screen within the facility of the organization via a pop-up, an electronic mail, or an instant message, and printing a badge for the visitor, the badge having a radio-frequency device for sign-in of the visitor to the organization, sign-out of the visitor to the organization, tracking a location of the visitor at the organization, controlling access of the visitor to the organization, or mobile scanning of the badge, wherein the badge includes a machine readable code.

2. The computer-implemented method of claim 1, wherein the machine readable code identifies the visitor for signing the visitor in and/or out of a facility of the organization.

3. The computer-implemented method of claim 1, further comprising storing, on the portable computing device, a robust version of the visitor application, the robust version of the visitor application having more features than features of a basic version of the visitor application, and the features of the robust version providing a data log storing data associated with at least one of contacts of visits, frequency of visits, or purpose of visits.

4. The computer-implemented method of claim 1, further comprising:

sending an identification of a digital camera connected to the portable computing device;
receiving, by the portable computing device, an instruction to configure the digital camera connected to the portable computing device; and
configuring the digital camera connected to the portable computing device for capturing an image of the visitor.

5. A computer-implemented method comprising:
under control of a portable computing device comprising one or more processors configured with executable instructions,
storing, on the portable computing device, a visitor application that provides a user interface (UI) to a user of the portable computing device;
sending a request to a server to set up the portable computing device, the request including:
an identification of the portable computing device that sent the request; and
an identifier of a version of the visitor application stored on the portable computing device;
sending an identification of a printer connected to the portable computing device;
receiving an instruction to configure the printer connected to the portable computing device;
configuring the printer connected to the portable computing device according to the received instruction;
receiving, via the UI, user input to sign in a visitor;
based at least in part on the user input, sending a request to notify an individual that the visitor has signed in, the notification including an image of the visitor to be displayed by a smart device and a display screen within a facility of the organization via a pop-up, an electronic mail, or an instant message; and
printing a badge for the visitor, the badge including a machine readable code.

6. The computer-implemented method of claim 5, further comprising:
sending an identification of a digital camera connected to the portable computing device;
receiving, by the portable computing device, an instruction to configure the digital camera connected to the portable computing device; and
configuring the digital camera connected to the portable computing device for capturing the image of the visitor.

7. The computer-implemented method of claim 5, wherein the machine readable code identifies the visitor for signing the visitor in and/or out of a facility of the organization.

8. The computer-implemented method of claim 5, further comprising storing, on the portable computing device, a robust version of the visitor application, the robust version of the visitor application having more features than features of a basic version of the visitor application, and the features of the robust version providing a data log storing data associated with at least one of contacts of visits, frequency of visits, or purpose of visits.

9. The computer-implemented method of claim 5, wherein the badge includes a radio-frequency device.

10. The computer-implemented method of claim 5, wherein the radio-frequency device identifies the visitor for sign-in of the visitor to the organization, sign-out of the visitor to the organization, tracking a location of the visitor at the organization, controlling access of the visitor to the organization, or mobile scanning of the badge.

11. A computer-implemented method comprising:
under control of a portable computing device comprising one or more processors configured with executable instructions,
storing, on the portable computing device, a robust version of a visitor application, the robust version of the visitor application having more features than features of a basic version of the visitor application, and the features of the robust version providing:
   a data log storing data associated with at least one of contacts of visits, frequency of visits, or purpose of visits; and
   a user interface (UI) to a user of the portable visitor station;
sending a request to a server to set up the portable visitor station, the request including:
   an identification of the portable computing device that sent the request; and
   an identifier of a version of the visitor application stored on the portable computing device;
sending an identification of a printer connected to the portable computing device;
receiving an instruction to configure the printer connected to the portable computing device;
configuring the printer connected to the portable computing device according to the received instruction;
receiving, via the UI, user input to sign in a visitor;
based at least in part on the user input, sending a request to send a notification to an individual that the visitor has signed in, the notification including an image of the visitor to be displayed by a smart device and a display screen within a facility of an organization, wherein the image is to be displayed by the smart device and the display screen within the facility of the organization via a pop-up, an electronic mail, or an instant message, and printing a badge for the visitor, wherein the badge includes a machine readable code.

12. The computer-implemented method of claim 11, wherein the machine readable code identifies the visitor for signing the visitor in and/or out of a facility of the organization.

13. The computer-implemented method of claim 11, wherein the badge includes a radio-frequency device for sign-in of the visitor to the organization, sign-out of the visitor to the organization, tracking a location of the visitor at the organization, controlling access of the visitor to the organization, or mobile scanning of the badge.

14. The computer-implemented method of claim 11, further comprising:
   sending an identification of a digital camera connected to the portable computing device;
   receiving, by the portable computing device, an instruction to configure the digital camera connected to the portable computing device; and
   configuring the digital camera connected to the portable computing device for capturing an image of the visitor.

* * * * *